US004001628B2

United States Statutory Invention Registration [19]

[11] Reg. Number: H1628

Ekanayake et al.

[45] Published: Jan. 7, 1997

[54] TEA EXTRACT AND PROCESS

[76] Inventors: Athula Ekanayake, The Procter & Gamble Company, Miami Valley Laboratories; Edmund P. Pultinas, Jr., The Proctor & Gamble Company, Miami Valley Laboratories, P.O. Box 398707, both of Cincinnati, Ohio 45239-8707

[21] Appl. No.: 603,700

[22] Filed: Feb. 20, 1996

Related U.S. Application Data

[63] Continuation of Ser. No. 439,811, May 12, 1995, abandoned, which is a continuation of Ser. No. 178,702, Jan. 10, 1994, abandoned.

[51] Int. Cl.[6] ..... A23F 3/16

[52] U.S. Cl. ..... 426/597

[58] Field of Search ..... 426/597

[56] References Cited

U.S. PATENT DOCUMENTS

| | | | |
|---|---|---|---|
| 2,785,979 | 3/1957 | Mitchell | 99/77 |
| 2,891,865 | 6/1959 | Seltzer et al. | 99/77 |
| 2,927,860 | 3/1960 | Seltzer et al. | 99/77 |
| 3,108,877 | 10/1963 | Cooper . | |
| 3,113,028 | 12/1963 | Cooper et al. . | |
| 3,151,985 | 10/1964 | Forbes | 99/77 |
| 3,598,608 | 8/1971 | Ganiaris | 99/77 |
| 3,949,098 | 4/1976 | Bangert | 426/324 |
| 4,004,038 | 1/1977 | Wickremasinghe | 426/422 |
| 4,051,267 | 9/1977 | Jongeling | 426/330.3 |
| 4,156,024 | 5/1979 | Husaini | 426/257 |
| 4,440,796 | 4/1984 | Lunder et al. | 426/597 |
| 4,472,441 | 9/1984 | Clark et al. | 426/387 |
| 4,539,216 | 9/1985 | Tse | 426/597 |
| 4,613,672 | 9/1986 | Hara | 549/399 |
| 4,668,525 | 5/1987 | Creswick | 426/597 |
| 4,680,193 | 7/1987 | Lunder et al. | 426/597 |
| 4,717,579 | 1/1988 | Vietti et al. | 426/597 |
| 4,748,033 | 5/1988 | Syfert et al. | 426/330.3 |
| 4,851,252 | 7/1989 | Greither et al. | 426/599 |
| 4,935,256 | 6/1990 | Tsai | 426/330.3 |
| 4,946,701 | 8/1990 | Tsai et al. | 426/597 |
| 5,198,259 | 3/1993 | Hoogstad | 426/435 |

FOREIGN PATENT DOCUMENTS

| | | | |
|---|---|---|---|
| 464919 | 1/1992 | European Pat. Off. | A23F 3/16 |

OTHER PUBLICATIONS

Pinatauro, N. D. "Tea and Souble Products Manufacture", *Food Technology Review*, No. 38 (1977), pp. 82–85.

*Primary Examiner*—Charles T. Jordan
*Assistant Examiner*—John R. Hardee

[57] ABSTRACT

A process for the production of tea extracts is disclosed comprising the steps of (a) extracting tea materials with water, (b) mixing the extract containing solution with protein, (c) acidifying the protein containing extract, and (d) separating the precipitates formed. The resultant tea extracts have reduced bitter and astringent flavors and low levels of polymerized or oxidized flavanols. The extracts are suitable for use as beverages or can be blended with fruit flavors, fruit juices and other flavors.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEA EXTRACT AND PROCESS

This is a continuation of application Ser. No. 08/439,811, filed on May 12, 1995, now abandoned, which is a continuation of application Ser. No. 08/178,702, filed Jan. 10, 1994, now abandoned.

FIELD OF INVENTION

This invention relates to a process for making a tea extract, and in particular, a green tea extract, which is less bitter or astringent even though it contains caffeine and flavanols. This extract is used in making beverages.

BACKGROUND OF THE INVENTION

Typical tea processes for making tea concentrates use high extraction temperatures to ensure high yields and flavor component recovery. This is particularly true for black tea and also applies to green tea and oolong teas. The main disadvantages when this technique is used for green and oolong teas are that the resulting extracts are very bitter and astringent and are thus difficult to use, especially in non-tea beverage matrices, without eliciting consumer responses such as "astringent" and "harsh" when describing the resulting beverages.

An example of this problem is the process for making green tea solids as described in U.S. Pat. No. 4,935,256 awarded to Tsai et al., where the resulting tea solids had an astringent taste when incorporated in beverages. This had to be masked with various materials in order to make the beverages acceptable.

On the other hand many beneficial effects of green tea solids and of the flavanols are suggested by the literature. For example the caffeine in tea extracts does not appear to be as physiologically available as the caffeine in coffee. In fact green tea is believed to have a relaxing benefit owing to the flavanols ( i.e., catechins and epicatechins) present in green tea. The use of these materials with caffeine in a stable form in beverages is described in U.S. Pat. No. 4,946,701 awarded to Kuznicki et al.

In view of the above mentioned processing difficulties, typical tea processes to obtain these flavanols often includes extracting primarily the high quality teas or extraction of the leaf and the immediately adjoining stems and leaves from choice grade teas. Lower grade teas, made from less suitable leaves and plants are generally considered inferior due to the harsh and astringent taste character.

The harshness and astringency of green tea is known to be largely dependent on the flavanols and caffeine. The harsh taste is believed to be mitigated by the free amino acids, especially that of theanine. Theanine or 5-(N-ethyl)-glutamine is unique to Camellia species, from which genus, green and black teas are made.

An object of this invention is to remove fractions of the flavor attributed to negative taste and to provide a method of improving or mellowing extracts of all but especially low grade teas.

A particular object of the subject invention is to provide tea extracts containing tea solids, including caffeine, amino acids, especially higher levels of theanine, flavanols and very little oxidized or polymerized flavanols or polyphenols. This product is less astringent and less harsh in taste and provides all of the benefits of the green tea solid/caffeine mixtures.

A further object of the subject invention is to provide processes for obtaining such tea extracts.

Another object of this invention is to provide a beverage which provides the beneficial effects of this extract and which is stable in liquid form.

Still a further object of this invention is to provide a beverage which contains caffeine and which provides the alertness benefit of caffeine along with the beneficial effects of the flavanols and other green tea solids.

These and other objects will become apparent from the description herein.

All percentages are by weight unless otherwise indicated.

SUMMARY OF THE INVENTION

The subject invention relates to a process for producing a tea product comprising the steps of:

(a) Contacting tea materials with water, at a ratio of tea materials to water, of from about 1:40 to about 1:3 at a temperature of from about 20° C. to about 45° C. for a period of time sufficient to produce an aqueous extract containing from about 0.75% to about 2.0% by weight, tea solids;

(b) Separating the aqueous extract of step (a) from solid tea materials residue;

(c) Contacting the solid tea materials residue of step (b) with water, at a ratio of tea materials to water, of from about 1:30 to about 1:7 at a temperature of from about 30° C. to about 65° C. for a period of time sufficient to produce an aqueous extract containing from about 0.50% about 2.0% by weight, tea solids;

(d) Separating the aqueous extract of step (c) from the solid tea materials residue;

(e) Combining the aqueous tea extract from step (b) and step (d);

(f) Mixing the extract from step (e), at a temperature of from about 40° C. to about 50° C., with from about 5% to about 35% by weight protein, based on the amount of soluble solids present in the extract;

(g) Concurrently adding from about 0.15% to about 0.25% edible acid and from about 0.025% to about 0.075% edible buffering salt to the aqueous tea extract of step (f) to obtain a pH of from about 2.9 to about 3.4;

(h) Optionally separating any precipitate from the aqueous tea extract of step (g);

(i) Cooling the aqueous tea extract from step (g) or (h) to a temperature of from about 0° C. to about 20° C.;

(j) Separating any solid precipitate from the cooled extract of step (i);

(k) Optionally, concentrating the tea product; and (1) Optionally, drying the tea product.

The subject invention also relates to a tea extract which is a product of the above process, and a beverage comprising:

(a) an amount of the tea product, such that the quantity of tea solids in the beverage is from about 0.02% to about 0.25%;

(b) an effective amount of flavorant;

(c) optionally, an effective amount of sweetener;

(d) water; and (e) optionally, from 0% to about 150% of the RDA of Vitamins A, C, and E.

DETAILED DISCUSSION OF THE INVENTION

A. Definitions

As used herein, the term "comprising" means various components can be conjointly employed in the processes, tea products and beverages in the present invention. Accordingly, the term "comprising" encompasses the more restrictive terms "consisting essentially of" and "consisting of".

As used herein, the term "soluble solids" or "solids" refers to the solid materials extracted from the aqueous tea solution which are soluble in water. These solids include caffeine, flavanols, amino acids (especially theanine), edible acids, buffering salts, proteins and related materials.

As used herein, the term "tea materials" includes materials obtained from the genus Camellia including *C. sinensis* and *C. assaimica,* for instance, freshly gathered tea leaves, fresh green tea leaves that are dried immediately after gathering, fresh green tea leaves that have been heat treated before drying to inactivate any enzymes present, unfermented tea, instant green tea, partially fermented tea leaves. Green tea materials are tea leaves, tea plant stems and other plant materials which are related and which have not undergone substantial fermentation to create black teas. Members of the genus Phyllanthus, *Catechu gambir* or Uncaria family of tea plants can also be used. Mixtures of unfermented and partially fermented teas can be used.

As used herein, "tea solids" means solids extracted from tea materials.

As used herein "flavanols" or "catechins" means primarily catechin, epicatechin, and their derivatives. These derivatives include the sugar salts, sugar esters, and other edible physiologically available derivatives. Green tea solids contain these flavanols. The preferred flavanols are catechin, epicatechin, galiocatechin, epigaliocatechin, epicatechin gallate, and epigallocatechin gallate.

By "nutritional" or "nutritionally-supplemental amount" herein is meant that the vitamin sources optionally used in the practice of this invention provide a nourishing amount of said vitamins. This supplemental amount will comprise up to 150% of the Recommended Dietary Allowance (RDA) of the daily intake of Vitamin A, C, and E. Preferably, at least 25% of the RDA will be provided. The RDA for vitamins is defined in the United States of America (see Recommended Daily Dietary Allowance-Food and Nutrition Board, National Academy of Sciences-National Research Council). This is supplemental or in addition to the amount found in the diet.

As used herein, the term "beverage" refers to a beverage composition which is in a single strength, ready-to-serve drinkable form or is a concentrate which can be diluted with water or carbonated water to form a drinkable beverage. The terms beverage syrup and concentrates can be used interchangeably.

As used herein, the term "sugar" refers to mono- and disaccharide sweeteners. Examples of such sugars include sucrose, glucose, fructose, high fructose corn syrup, invert syrup, refiners syrup, corn syrup, maltose and high maltose syrups and mixtures thereof. Preferred sugars are sucrose and high fructose corn syrup.

As used herein, the term "beverage syrup" refers to a beverage concentrate which further comprises sugar. Beverage syrups typically comprise from 30% to about 70% by weight sugar. Beverage syrups are diluted to form beverage concentrates and beverage drinks.

As used herein, the term "sweetener" is a material which provides a sweet flavor. Sweetener includes added materials as well as those sweeteners that are naturally present as in fruit juices. Examples of sweeteners include sugars, artificial sweeteners, sugar alcohols, and other naturally sweet compounds.

As used herein, the term "carbonated" means that the beverage contains both dissolved and dispersed carbon dioxide.

As used herein, the term "flavorant" means a natural or synthetic fruit flavor, botanical flavor, and mixtures thereof. Fruit flavors are derived from the edible reproductive part of a seed plant, especially sweet pulp associated with the seed. Botanical flavor refers to flavors derived from other parts of a plant other than its fruit, e.g., roots or leaves. Fruit juice is a natural flavorant.

B. Method for Making Tea Extract

The first step of the process of the present invention comprises contacting the tea materials with water. Any type of tea materials can be used in the present invention. Examples of unfermented teas are fresh tea leaves, green tea, and instant green tea. An example of partially fermented tea is Oolong tea. The leaves may be whole or comminuted, for example, a powder. Preferably green tea leaves are used in the present invention. When tea leaves are used, a ratio of tea leaves to water of from about 1:7 to about 1:40, preferably from about 1:7 to about 1:30 and more preferably from about 1:8 to about 1:20 is used. The extraction may be carried out batchwise, semi-continuously, continuously or by equivalent procedures. The preferred methods are batchwise or semi-continuous. The most preferred method is semi-continuous. Batch or multiple extractions is preferably carried out at a temperature of from about 20° C. to about 45° C., and more preferably at a temperature of from about 30° C. to about 45° C. The extraction is carried out a period of time sufficient to produce an aqueous extract containing from about 0.75% to about 2% tea solids, preferably from about 1% to about 1.5% tea solids. An extract containing a suitable amount of tea solids is generally obtained in from about 0.5 hours to about 4 hours, preferably in about 1 to about 2 hours and more preferably in about 1.5 hours. Longer periods of extraction times are possible but are usually unnecessary.

The extract is separated from the tea leaves and other solid tea residue, for example, by settling and decanting, filtration, or centrifugation.

Fresh water is added to the tea leaves at a ratio of from about 1:7 to about 1:30 preferably from about 1:7 to about 1:15. The second extraction is carried out at temperature of from about 30° C. to about 65°, preferably at from about 35° C. to about 55° C. and more preferably at temperature of from about 40° C. to about 50° C. The extraction is carried out a period of time sufficient to produce an aqueous extract containing from about 0.50% to about 2% tea solids, preferably from about 0.5% to about 1.0% tea solids. An extract containing a suitable amount of tea solids is generally obtained in from about 10 minutes to about 30 minutes, preferably about 15 minutes. Longer periods of extraction times are possible but are usually unnecessary.

Alternatively, the extraction of tea can be carried out in a semicontinuous manner. Tea is added to water at a ratio of from 1:15 to about 1:7. Extraction temperatures are maintained at 35° C. to 55° C., preferably 40° C. to 50° C. Water is added to the extraction vessel and extract is removed at the same time to maintain the indicated teas water ratio. The extraction proceeds from about one to three hours until the yield of the tea solids is from about 25% to 35%. The pooled extract contains from about 0.75% to about 2.5% tea solids. The tea materials are separated by means of centrifuging or equivalent means known in the art.

The tea extract is then mixed with a protein. Optionally, the protein can be added in either of the above extraction steps, but is preferably added after them. The amount of protein suitable is from about 5% to about 35%, and preferably from about 10% to about 30% by weight, based on the amount of soluble solid present in the extract as measured by a refractometer. The extract is mixed with protein at a temperature of from about 40° C. to about 50° C. Any type of animal or vegetable protein can be used. The preferred proteins are the caseinates, whey protein, soy protein and isolates, albumins, and gelatin. The most preferred source of protein is gelatin extracted from animal protein. Gelatin is readily available in a solid form. The particle size of the gelatin is not critical. The gelatin may also be added as a concentrated solution. The duration of mixing the extract with protein is not critical. The precipitation of the insoluble tea components is achieved almost instantaneously but, the mixing is generally carried out for a period of up to about 20 minutes and preferably from about 5 to about 15 minutes.

The aqueous tea extract is acidified with sufficient edible acid to lower the pH of the extract from about 2.9 to about 3.4, preferably from about 3.0 to about 3.2. The extract can be acidified before the protein is added, but preferably is done after the addition of the protein. Optionally, the acid can be added in either of the above extraction steps, but is preferably added after them. Any edible food grade organic or inorganic acid can be used. In general, any food compatible acid, or combination of food compatible organic and inorganic, is acceptable for lowering the pH. Edible organic acids which can be used include fumaric, citric, malic, acetic, lactic, propanoic, adipic, tartaric, succinic and the like. A certain level of inorganic acids may also be used for lowering the pH. These include phosphoric, carbonic, sodium hydrogen phosphate, and other suitable acids. The most preferred acid is citric acid.

Along with the above addition of acid, the aqueous tea extract is buffered by the addition of from about 0.025% to about 0.075% edible buffering salt, preferably from about 0.03% to about 0.05%, to the aqueous tea extract. Optionally, the salt can be added in either of the above extraction steps, but is preferably added after them. Any edible buffering salt can be used. The preferred material is an alkali or alkaline earth metal salt of citric acid, such as sodium, potassium or calcium citrate. Other salts such as potassium tartrate, sodium lactate, sodium hydrogen phosphate, sodium dihydrogen phosphate and related alkaline earth or alkali metal salts of these materials can be used.

The protein and precipitates are separated from the aqueous tea extract, e.g., by using centrifugation, filtration or other conventional techniques. The preferred method of separation is centrifugation.

The aqueous tea extract is then cooled to a temperature of from about 0° C. to about 20° C., preferably from about 10° C. to about 15° C. Any solid precipitate in the cooled extract is removed. The solids can be removed by conventional methods known in the art. Preferably, the cooled extract is filtered and centrifuged to help remove any solid particles.

The resulting aqueous tea extract solution comprises flavanols, polyphenols, caffeine and rheanine. It has a pH below 3.5 and contains the buffering salt and edible acid. The presence of increased theanine and reduced oxidized flavanols provides less astringent, less harsh extract. This enhances the flavor and physical stability of the liquid tea extract. This extract can be used to make beverages of the type hereinafter described.

Optionally, depending upon the desired concentration of tea solids in the product, the extract can be further concentrated by suitable methods such as evaporation, reverse osmosis, freeze concentration, rotary evaporator concentration or other suitable methods known in the art. The extract may be concentrated to a concentration of tea solids of from about 2% to about 65%, preferably from about 3% to about 55%, more preferably from about 35% to about 50%.

If desired, the tea extract may be devolatilized. Suitable methods include using a stripper column, stripping evaporation, flash evaporation and boiling.

Optionally the extract can be dried to produce reconstitutable tea extract solids. Conventional drying means, such as freeze drying, vacuum belt drying and spray drying can be used to provide a substantially water-free, shelf stable powder which can be reconstituted. A concentrated extract suitable for drying preferably has from about 25% to about 60% soluble solids, preferably from about 30% to about 60% and more preferably from about 40% to about 60% soluble solids.

It is preferable during the above optional concentration and drying steps to not exceed a temperature of about 70° C., more preferably to not exceed a temperature of about 50° C.

C. Beverages

The tea-containing beverages produced in accordance with this invention are of acceptable flavor, color and aroma.

To a tea extract of the present invention, sweetener, flavoring, colorants, and other optional ingredients can be added. The beverage may also contain nutritionally-supplemental amounts of Vitamins A, C, E and their precursors, such as beta-carotene. Other vitamins such as D and B can also be added.

In making a single strength beverage, a beverage concentrate or beverage syrup is usually formed first. This beverage concentrate typically contains an emulsifier and water soluble flavors, emulsion stabilizing agents and weighting agents, if needed, and any color and/or suitable preservatives. After the concentrate is formed, sugar and water are added to make a beverage syrup. This beverage syrup is then mixed with an appropriate quantity of water or carbonated water to form a finished beverage or finished beverage concentrate. The weight ratio of water:syrup is from about 2:1(3X syrup) to about 4:1(5X syrup).

Tea Solids

The beverages of the subject invention comprise a tea extract of the subject invention. The tea extract may be dilute, concentrated or dried. Single strength beverages preferably contain from about 0.02% to about 0.25% tea solids obtained by using such extract, more preferably from about 0.07% to about 0.15% tea solids. Beverage concentrates and syrups preferably comprise from about 0.21% to about 0.75% soluble tea solids.

The amount of theanine, catechins or flavanols in the tea extracts and beverages of the subject invention can vary.

The ratio of caffeine to flavanols in the tea extracts and beverages of the subject invention is preferably from about 1:1 to about 1:30, more preferably from about 1:1 to 1:10, still more preferably from about 1:2 to about 1:5.

The Water Component

Beverages of the present invention typically comprise at least 40% water when in a concentrated form and at least 80% water, preferably at least 85% water when in a single strength form. Sugar sweetened beverage concentrates typically comprise between 25% to 75%, and preferably from 40% to 60% water. Concentrates are usually formulated to provide a single strength drinkable beverage when diluted with two to four parts by weight water.

Carbon dioxide can be introduced into the water which is mixed with the beverage syrup or into the dilute beverage to achieve carbonation. The carbonated beverage is usually placed into a container such as a bottle or can and then sealed. Any conventional carbonation methodology can be used to make the carbonated beverages of this invention.

The amount of carbon dioxide in the beverage will depend upon the particular flavor system used and the amount of carbonation desired. Usually, carbonated beverages of the present invention contain from 1.0 to 4.5 volumes of carbon dioxide. The preferred carbonated beverages contain from 2 to about 3.5 volumes of carbon dioxide.

Sweeteners

Beverages and beverage syrups of the present invention contain a sweetener. The sweeteners typically used are carbohydrates or sugars.

Sugars, especially high fructose corn syrup, provide body to the beverage which enhances its textural preference.

Sugar alcohols can also be used in the beverages of the present invention. These sugar alcohols include sorbitol, mannitol, and xylitol. Usually, however, these materials are not used as the sole sweetener because in the levels required to sweeten beverages, they have a side effect of flatulence or related gastrointestinal related problems.

For diet beverages, non-caloric sweeteners can be used. Examples of such sweeteners include aspartame, saccharine, cyclamates, acetosulfam, L-aspartyl-L-phenylalanine lower alkyl ester sweeteners, L-aspartyl-D-alanine amides as disclosed in U.S. Pat. No. 4,411,925 to Brennan, et al (1983), L-aspartyl-D-serine amides disclosed in U.S. Pat. No. 4,399,163 to Brennan et al (1983), L-aspartyl-hydroxymethylalkane amide sweeteners disclosed in U.S. Pat. No. 4,338,346 issued to Brand (1982), L-aspartyl-1-hydroxyethylalkane amide sweeteners disclosed in U.S. Pat. No. 4,423,029 to Rizzi (1983), glyccherins, synthetic alkoxy aromatics, etc. Lo Hah Guo juice which contains a natural sweetener can also be used as a sweetener. When it is used the amount of sugar is usually about half that normally present in a beverage.

The amount of sweetener effective in the beverages of the present invention depends upon the particular sweeteners used and the sweetness intensity desired. For non-caloric sweeteners this amount varies depending upon the sweetness intensity of the particular sweetener.

Another way of measuring the amount of sweetener is to base it upon the sweetness compared to sucrose. For carbohydrates or sugars, the amount of sweetener can be from about 1% to about 15%, and preferably from 5% to about 15% by weight for single strength beverages. Preferred single strength beverages contain from 9% to about 14% by weight sugar.

For artificial sweeteners, the amount of sweetener can be from about 0.001% to about 0.1%. The amount of artificial sweetener is based on obtaining a taste similar to beverages containing 11% sucrose or fructose.

Mixtures of low calorie or artificial sweeteners sugars can also be used in the present invention, i.e., a mixture of aspartame and sucrose or high fructose corn syrup can be used. This provides a reduced calorie beverage.

For beverage syrups of the present invention, the amount of sugar used is significantly higher. Usually, the amount of sugar in a beverage syrup is from 30% to 70% by weight. Preferably, such beverage syrups contain from 40% to 60% by weight sugar.

The Flavor Component

The flavor component of the beverages and beverage concentrates and syrups of the present invention is a natural or artificial flavor selected from fruit flavors, botanical flavors and mixtures thereof. Fruit flavors refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. Particularly preferred fruit flavors are the citrus flavors including orange, lemon, lime and grapefruit flavors. A variety of other fruit flavors can be used such as apple, grape, cherry, strawberry, raspberry, cranberry, pineapple, coconut, mango, passion fruit, guava, Lo Han Guo, kiwi and the like. These fruit flavors can be derived from natural sources such as fruit juices and flavor oils or synthetically prepared. If desired, fruit juices, including orange, lemon, lime, apple and grape can be used in a flavor component.

As used herein, the term botanical flavor refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include cola flavors, tea flavors, coffee, mints, amaretto, vanilla, chocolate, and the like. These botanical flavors can be derived from natural sources such as essential oils and extracts or be synthetically prepared. Coffee, black tea, and herbal tea extracts can be used as the flavorant herein.

The flavor component can comprise a single flavor or blended flavors. For example, lime and lemon flavors, cola flavors with citrus or cherry flavors, and pineapple and orange flavors are preferred flavor blends.

The flavors in the flavor component are sometimes formed into an emulsion, which is then dispersed into the beverage concentrate. Emulsion droplets usually have a specific gravity less than that of the water and therefore can form a separate phase. Weighting agents, which can also act as clouding agents, are typically used to keep the emulsion droplets dispersed in the beverage. Examples of such weighting agents are brominated vegetable oils, rosin esters and, in particular, ester gums. Any weighting agent that is commercially available can be used in this invention. Besides weighting agents, emulsifiers and emulsion stabilizers can be used to stabilize the flavor emulsion droplets. Examples of such emulsifiers and emulsion stabilizer include gums, pectins, cellulose, polysorbates, sorbitan esters and propylene glycol alginates.

The particular amount of the flavor component effective for imparting flavor characteristics to the beverages and beverage concentrates of the present invention will depend upon the flavor, the flavor impression and formula flavor component. For flavor components which are substantially free of fruit juice, that is, which are not 100% fruit juice, the flavor component can comprise at least 0.05% by weight of the beverage composition and typically from 0.1% to about 2% by weight of the beverage (on a single strength basis). The particular preferred flavorant is fruit juice. When fruit juices are used, the flavor component can comprise, on a single strength basis, up to 20% fruit juice by weight of the beverage, preferably from 5% to 15% fruit juice by weight for either carbonated or non-carbonated beverages. Fruit juices contain about 12% sweetener or sugar solids, but the majority of the juice is water. Juice beverages can also contain up to 60% juice as the primary flavorant.

Coffee beverages can also be used in the present invention. Regular or decaffeinated coffees including flavored coffees can be blended with the catechins. Flavored coffee included spiced coffees, orange, chocolate, toffee, mocha, cream and other flavored coffees. Black teas, flavored teas, and herbal teas can also be used herein. These include lemon, apple and orange flavored teas, cinnamon, spice, mint, rose, hibiscus and chamomile teas. At least about 0.02% flavorant is used.

pH and Other Beverage Ingredients

The pH of the beverages, beverage concentrates or syrups of the present invention is dependent upon the particular composition of the acid component, the total amount of acids used and the sourness impression desired. Typically, the pH can range from 2.5 to about 5. Preferred carbonated and dilute beverages have a pH of from about 2.5 to about 4.0.

The pH of the beverage is controlled by the addition of edible acids, as well as organic edible acids. Any edible food grade organic or inorganic acid can be used. In general, any food compatible acid, or combination of food compatible organic and inorganic, is acceptable. The acids can be present in their undissociated form or else as their respective salts. Edible organic acids which can be used include fumaric, citric, malic, acetic, lactic, propanoic, adipic, tartaric, gluconic, and succinic or mixtures thereof. Inorganic acids may also be used. These include phosphoric, carbonic, sodium hydrogen phosphate, and other suitable acids.

Caffeine Components

Additional caffeine can be added separately or as a component of the flavor system. Kola, cocoa nuts, coffee and teas contain caffeine. The caffeine present in them should be factored into the percentage of caffeine in the beverage. Purified caffeine obtained from the extraction of coffee or synthetically produced caffeine can also be used.

The amount of caffeine is from about 0.002% to about 0.05% by weight of the single strength beverage. Preferably, the amount of caffeine is from about 0.005% to about 0.02%. For the concentrates or syrups the caffeine level will preferably be from about 0.006% to about 0.15%. Caffeine levels can be higher if flavored coffees which have not been decaffeinated are used since these materials contain caffeine naturally.

Stability

One of the problems with flavanols is their stability in liquids. Catechins tend to form polymeric materials. The beverages herein are stable against precipitation and sediment for more than 3 months at room temperature, whether or not caffeine is present in the beverage.

Nutritional Supplementation

Vitamins can also be added to the beverages of the subject invention. Preferably Vitamins & C, and E are added. The anti-oxidant vitamins and other vitamin precursors such a beta-carotene can also be added.

Typical Beverage Formulation

A typical beverage contains:

(a) tea extract from an above process, such that the quantity of tea solids in a single strength beverage is from about 0.02% to about 0.25%;

(b) an effective amount of flavorant, preferably from 0.05% to 20%;

(c) an effective amount of sweetener, preferably from 0.001% to 14%: and (d) water, wherein the caffeine:flavanol ratio of the beverage is from 1:1 to about 1:30.

When the flavor is juice and the sweetener is sugar, the beverage can contain up to 60% fruit juice or fruit juice concentrates, sufficient sugar to bring the percent sugar to between 11% and 14%, and from 0.02% to 0.25% tea solids.

The following are non-limiting examples of the subject invention.

EXAMPLE I 6.5 lb. Chinese green tea fannings is extracted in 114 lb. water containing 0.15% medium bloom Knox® gelatin, 0.25% citric acid and 0.05% sodium citrate (by weight of water) at 40° C. for 3 hours with stirring. The extract (103.1 lb., 1.63% soluble solids determined by refractometry) is removed by decanting and filtering and the residual tea is extracted with 65 lb. water at 50° C. for 15 minutes. After decanting and filtering the second extract (59.7 lb., 0.77% sol. solids), the 1st and 2nd extracts are combined, cooled to 10° C., and centrifuged at 8,000×g using a continuous centrifuge. The clarified tea extract is concentrated under vacuum (28" Hg) to a % soluble solid of about 16%. On diluting, a tea product comprising about 1% soluble solids is obtained; analysis of this tea product by HPLC (catechins and caffeine) and Capillary zone electrophoresis (theanine) shows the following: epigallocatechin 835 ppm, epicatechin 488 ppm, epigallocatechingallate 1131 ppm, epicatechingallate 197 ppm, caffeine 942 ppm and theanine 329 ppm.

EXAMPLE II 7 lbs. Chinese green tea fannings is extracted in 113 lb. water at 40° C. for 3 hours with stirring. The extract (111.8 lb., 1.67% sol. solids) is removed by decanting and filtering and the residual tea solids are extracted with 70 lb. water at 50° C. for 15 minutes. After decanting and filtering the second extract (67.2 lb., 0.62% sol. solids), the 1st and 2nd extracts are combined in a vessel equipped with a stirrer. 246 g medium bloom Knox® gelatin (equivalent to 25% of the amount of the tea solids of combined extract) is added to the tea extract and dissolved. This is followed by the addition of citric acid (203 g–25% of the soluble solids of the extract) and sodium citrate (41 g-0.05% of the soluble solids of the extract). The resulting turbid solution is cooled to 10° C., and centrifuged at 8,000×g using a continuous centrifuge. The clarified tea extract is concentrated under vacuum (28" Hg) to a % soluble solids of about 16%. On diluting, a tea product comprising about 1% soluble solids is obtained; analysis of this tea product by HPLC (catechins and caffeine) and Capillary zone electrophoresis (theanine) shows the following: epigallocatechin 819 ppm, epicatechin 465 ppm, epigallo-catechingallate 906 ppm, epicatechingallate 173 ppm, caffeine 1020 ppm and theanine 542 ppm.

EXAMPLE III

A fruit based, shelf stable beverage is prepared by mixing the following ingredients.

| Ingredient | Amount (% by weight) |
|---|---|
| sugar — liquid sucrose (67.5% solids) | 1.5 |
| high fructose corn syrup (71% solids) | 19.3 |
| water | 75.68 |
| Kelcoloid[1] | 0.08 |
| citric acid | 0.4 |
| fruit juice concentrate[3] and flavor oils | 1.92 |
| green tea concentrate prepared according to Example II[2] | 1.12 |
| ascorbic acid | 0.05 |
| vitamin E acetate | 0.0006 |
| colors | 0.002 |
| vitamin A palmitate | 0.0003 |

[1]Kelcoloid is a gum based thickener available from Kelco, USA.
[2]The green tea concentrate from Example II has a solids content of 32%.
[3]The fruit juice concentrates are a mixture of tangerine, lime and orange juice concentrates.

EXAMPLE IV 312 grams of Chinese green tea fannings are added to 2500 grams of tap water at 43° C. while stirring with a mechanical stirrer. After about 5 minutes of stirring, water is added and extract is simultaneously withdrawn at a rate of about 75 grams per minute. The temperature is maintained between 37° C. and 43° C. during the extraction. The extraction is conducted for about 80 minutes. During the extraction the solids in the extract ranges from about 3.1% at the beginning of the extraction to 0.6% at the end of the extraction. The pooled extract grams have a tea solids concentration of 1.54%. The overall yield of tea solids is about 30% with a caffeine yield of about 2.47%. 3.85 grams of gelatin are added to 1000 grams of extract at 45° C. followed by the addition of 2.5 grams of citric acid and 0.5 grams of sodium citrate. The mixture is cooled to 15° C., filtered through a 60 mesh screen and centrifuged to remove residual solids. The extract is then concentrated by evaporation in a rotary evaporator to 35% solids.

While particular embodiments of the subject invention have been described, it would be obvious to those skilled in the art that various changes and modifications to the compositions disclosed herein can be made without departing from the spirit and scope of the invention. It is intended to cover, in the appended claims, all such modifications that are within the scope of the invention.

What is claimed is:

1. A process for producing a tea product comprising the steps of:

(a) Contacting green tea materials with water, at a ratio of tea materials to water, of from about 1:40 to about 1:3 at a temperature of from about 20° C. to about 45° C. for a period of time sufficient to produce an aqueous extract containing from about 0.75% to about 2.0% by weight, tea solids;

(b) Separating the aqueous extract of step (a) from solid tea materials residue;

(c) Contacting the solid tea materials residue of step (b) with water, at a ratio of tea materials to water, of from about 1:30 to about 1:7 at a temperature of from about 30° C. to about 65° C. for a period of time sufficient to produce an aqueous extract containing from about 0.50% about 2.0% by weight, tea solids;

(d) Separating the aqueous extract of step (c) from the solid tea materials residue;

(e) Combining the aqueous tea extract from step (b) and step (d);

(f) Mixing the extract from step (e), at a temperature of from about 40° C. to about 50° C., with from about 5% to about 35% by weight, based on the amount of soluble solids present in the extract, of an agent capable of precipitating insoluble tea components in the extract and consisting essentially of a protein selected from the group consisting of caseinates, whey protein, soy protein, soy protein isolates, albumins, and gelatin;

(g) Concurrently adding from about 0.15% to about 0.25% edible acid and from about 0.025% to about 0.075% edible buffering salt to the aqueous tea extract of step (f) to obtain a pH of from about 2.9 to about 3.4;

(h) Optionally separating any precipitate from the aqueous tea extract of step (g);

(i) Cooling the aqueous tea extract from step (g) or (h) to a temperature of from about 0° C. to about 20° C.;

(j) Separating any solid precipitate from the cooled extract of step (i).

2. The process of claim 1, wherein the ratio of tea materials to water in steps (a) and (c) is from about 1:8 to about 1:30, the temperature in step (a) is from about 30° C. to about 45° C., and the temperature in step (c) is from about 35° C. to about 55° C.

3. The process of claim 2, wherein the edible acid is selected from the group consisting of citric, malic, phosphoric and mixtures thereof and the edible buffering salt is selected from the group consisting of alkali and alkaline earth metal salts of these acids, and the protein comprises gelatin.

4. The process of claim 3, wherein the acid comprises citric acid, the edible buffering salt comprises sodium or potassium citrate, and the protein comprises animal gelatin.

5. The process of claim 3, wherein the cooling of step (i) is to from about 10° C. to about 15° C., and the separation of step (j) is achieved by centrifugation.

6. The process of claim 1 wherein the ratio of tea materials to water in step (a), is from about 1:20 to about 1:10, the temperature is from about 30° C. to about 40° C., and the aqueous extract contains from about 1.0% to about 1.5%, tea solids; the ratio of tea materials to water in step (c) is from about 1:7 to about 1:15, and the temperature is from about 40° C. to about 50° C. and the aqueous extract contains from about 0.5% to about 1.0% tea solids.

7. The process of claim 6 wherein the tea extract is concentrated to a solids content of from about 35% to about 50% soluble solids.

8. The process of claim 6 wherein the tea extract is dried.

9. The process of claim 6 further comprising removing at least a portion of the volatile aromatics from the aqueous tea extract of step (j) by stripping, evaporation, flash evaporation or boiling.

* * * * *